United States Patent [19]

Ueda

[11] 4,098,079
[45] Jul. 4, 1978

[54] SECONDARY AIR FEED CONTROL DEVICE OF AN INTERNAL COMBUSTION ENGINE

[75] Inventor: Tatehito Ueda, Susono, Japan

[73] Assignee: Toyota Jidosha Kogyo Kabushiki Kaisha, Toyota, Japan

[21] Appl. No.: 773,772

[22] Filed: Mar. 2, 1977

[30] Foreign Application Priority Data

Dec. 1, 1976 [JP] Japan ............... 51-143298

[51] Int. Cl.² ............... F02B 75/10; B60K 21/00
[52] U.S. Cl. ............... 60/290; 74/860; 123/119 EC
[58] Field of Search ............... 60/282, 285, 290, 289; 74/860; 123/119 EC

[56] References Cited

U.S. PATENT DOCUMENTS

| 3,744,346 | 7/1973 | Miner | 74/860 |
|---|---|---|---|
| 3,776,205 | 12/1973 | Maruoka | 60/285 |
| 3,805,642 | 4/1974 | Danek | 74/860 |
| 3,888,080 | 6/1975 | Nohira | 60/290 |
| 3,919,843 | 11/1975 | Arnaud | 60/289 |

FOREIGN PATENT DOCUMENTS 2,308,781   11/1973   Fed. Rep. of Germany ......... 60/285

Primary Examiner—Douglas Hart
Attorney, Agent, or Firm—Stevens, Davis, Miller & Mosher

[57] ABSTRACT

Disclosed is an internal combustion engine comprising a carburetor and a secondary air feed control valve for feeding secondary air into the exhaust system of the engine from the air pump driven by the engines. The engine further comprises a temperature detector for indicating whether the warm-up of the engine is completed, and a gear position detector for indicating whether the shift gear of the transmission of the engine is in the top gear position. A relatively lean air-fuel mixture is fed into the cylinder of the engine and a relatively small amount of secondary air is fed into the exhaust system when the shift gear of the transmission is in the top gear position after completion of the warm-up of the engine.

9 Claims, 3 Drawing Figures

SECONDARY AIR FEED CONTROL DEVICE OF AN INTERNAL COMBUSTION ENGINE

DESCRIPTION OF THE INVENTION

The present invention relates to a secondary air feed control device for purifying the exhaust gas in an internal combustion engine.

As is known to the general public, the amount of harmful $NO_x$ components is increased particularly when an engine is accelerated. Consequently, an internal combustion engine has been known in which, when the shift gear of the transmission of the engine is in the low gear position or in the second gear position, which positions are used at the time of acceleration, a relatively rich air-fuel mixture is fed into the cylinder of the engine, thereby reducing an amount of $NO_x$ components to be produced; while, when the shift gear of the transmission is in the top gear position, a lean air-fuel mixture or a mixture having an approximately stoichiometric air-fuel ratio is fed into the cylinder of the engine. In order to reduce an amount of unburned components HC and CO in the exhaust gas, an internal combustion engine of this type is usually provided with a catalytic converter containing an oxidizing catalyzer therein. In addition, in order to promote the oxidation of unburned components in the catalytic converter, an internal combustion engine of this type is further provided with a secondary air feed control device for feeding secondary air into the exhaust system of the engine. An amount of unburned components HC and CO in the exhaust gas is greatly increased when a rich air-fuel mixture is fed into the cylinder of the engine. Consequently, in a conventional internal combustion engine, a large amount of secondary air sufficient to promote the oxidation of a large amount of unburned components is always fed into the exhaust system of the engine. However, since a lean air-fuel mixture or a mixture having an approximately stoichiometric air-fuel ratio is fed into the exhaust system of the engine when the shift gear of the transmission is in the top gear position as mentioned above, an amount of unburned components HC and CO in the exhaust gas is reduced. Consequently, when the shift gear of the transmission is in the top position, if a large amount of secondary air is fed into the exhaust system of the engine, the amount of secondary air in the exhaust system becomes excessive. As a result of this, the temperature of the exhaust gas is decreased and, accordingly, the temperature of the catalyzer is decreased, whereby the purifying ability of the oxidizing catalyzer is extremely reduced. In addition, if a large amount of secondary air is fed into the exhaust system of the engine at the time of deceleration and of idling as in a conventional internal combustion engine, an amount of secondary air in the exhaust system becomes excessive as in the case wherein the shift gear of the transmission is in the top gear position.

Contrary to this, before the completion of the warm-up of the engine, in order to improve the drivability of the engine and to reduce an amount of $NO_x$ components in the exhaust gas, even if the shift gear of the transmission is in the top gear position, a relatively rich air-fuel mixture is fed into the cylinder of the engine. Consequently, at this time, since a large amount of unburned components HC and CO is discharged into the exhaust system of the engine, it is necessary to feed into the exhaust system a large amount of secondary air sufficient to promote the oxidation of a large amount of unburned components discharged from the cylinder of the engine.

An object of the present invention is to always ensure that a good purifying ability is available in such a way that, at the time of idling and of deceleration, and at the time when the shift gear of the transmission is in the top gear position after the completion of the warm-up of the engine, an amount of secondary air fed into the exhaust system of the engine is reduced, thereby preventing a decrease in the temperature of the catalyzer.

According to the present invention, there is provided a secondary air feed control device of an internal combustion engine for purifying the exhaust gas existing therein, said engine having a transmission, an intake passage and an exhaust passage equipped with a catalytic converter, said transmission having a shift gear, said control device comprising:

air-fuel mixture forming means for increasing an air-fuel ratio of an air-fuel mixture fed into said intake passage after a completion of the warm-up of the engine compared with the case wherein the warm-up of the engine is not completed, first detecting means for providing a first detecting signal which indicates the completion of the warm-up of the engine, second detecting means for providing a second detecting signal which indicates that the shift gear of said transmission is in the top gear position, additional fuel feed control means controlling a feeding amount of an additional fuel into said intake passage in response to a change in the vacuum in said intake passage and having (a) a first operating state in which the feeding operation of an additional fuel remains stopped and (b) a second operating state in which an additional fuel is fed into said intake passage when the vacuum level in said intake passage is greater than a predetermined level;

while stopping the feeding operation of an additional fuel when a vacuum level in said intake passage is smaller than a predetermined value, valve means controlling a feeding amount of secondary air into said exhaust passage located upstream of said catalytic converter in response to a change in the vacuum in said intake passage and having (c) a first opening state in which a relatively small amount of secondary air continues to be fed into said exhaust passage, and (d) a second opening state in which a relatively large amount of secondary air is fed into said exhaust passage when a vacuum level in said intake passage is greater than a predetermined level, while feeding a relatively small amount of secondary air into said exhaust passage when a vacuum level in said intake passage is smaller than a predetermined level, and shifting means responsive to said first and said second detecting signals for causing said additional fuel feed control means, and wherein valve means shift to said first operating state and said first opening state from said second operating state and said second opening state, respectively, when the shift gear of said transmission is in the top gear position after completion of the warm-up of the engine, and for causing said additional fuel feed control means and said valve means to shift to said second operating state and said second opening state from said first operating state and said first opening state, respectively, when the warm-up of the engine is not completed or when the shift gear of said transmission is not in the top gear position.

The present invention may be more fully understood from the following description of a preferred embodiment of the invention, together with the accompanying drawings.

DESCRIPTION OF A PREFERRED EMBODIMENT

The present invention will be described with reference to an embodiment in which the present invention is applied to an internal combustion engine using liquefied petroleum gas as a fuel. However, needless to say, the present invention can be applied to an ordinary gasoline engine.

Figure 1:
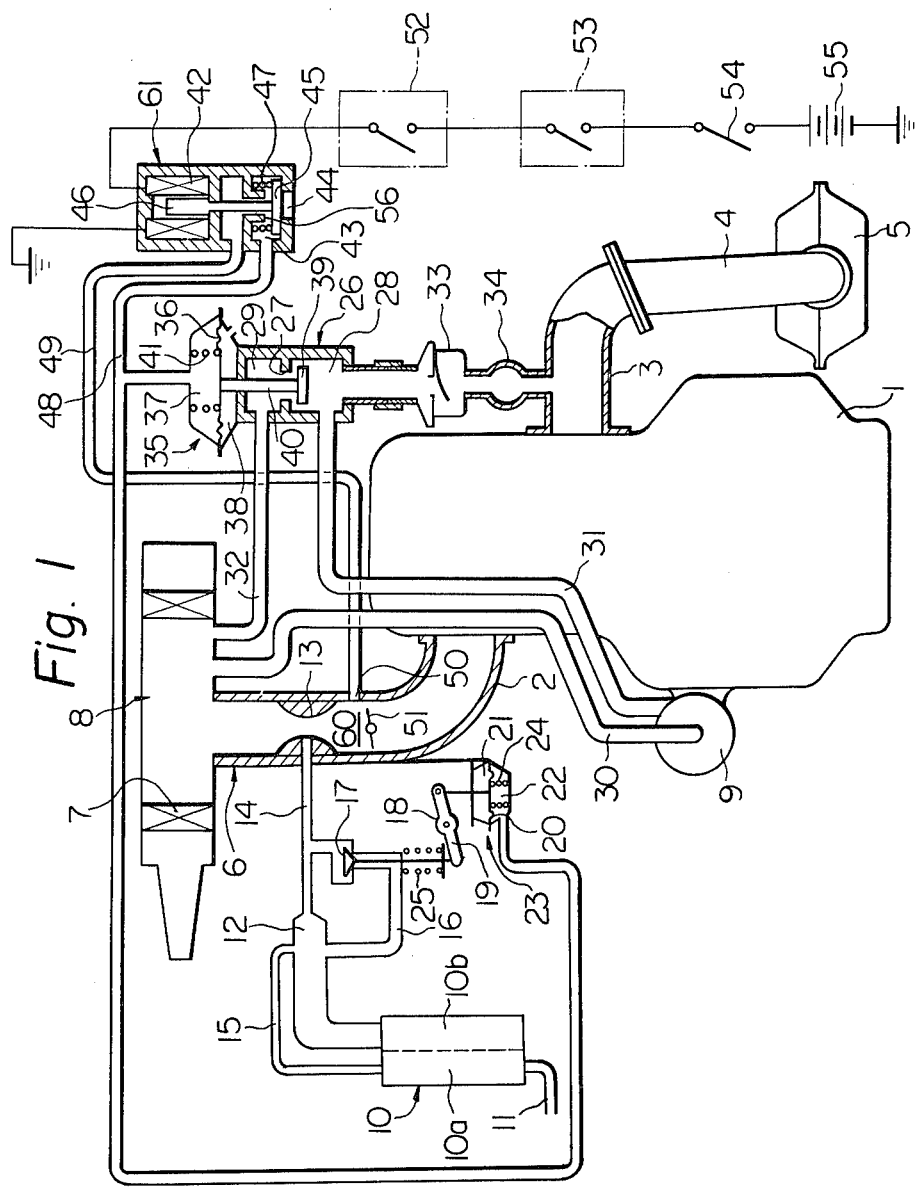
FIG. 1 is a schematic view of an internal combustion engine provided with a secondary air feed control device according to the present invention.

Referring to FIG. 1, an internal combustion engine according to the present invention comprises an engine body 1, an intake manifold 2, an exhaust manifold 3, an exhaust pipe 4 connected to the exhaust manifold 3, a catalytic converter 5 connected to the exhaust pipe 4 and containing an oxidizing catalyzer therein, a carburetor 6, an air cleaner 8 equipped with an air filter 7 and an air pump 9 driven by the engine. The carburetor 6 is provided with a regulator 10 for liquefied petroleum gas comprising a primary chamber 10a and a secondary chamber 10b. The primary chamber 10a is connected to a liquefied petroleum gas bomb (not shown) via a conduit 11, while the secondary chamber 10b is connected to a main nozzle 14 opening into a venturi portion 13 of the carburetor 6 via a main port 12. In addition, the primary chamber 10a is connected to the main port 12 via a slow port 15, while the main port 12 is connected to the main nozzle 14 via a power port 16. A power valve 17 is disposed in the power port 16 and is connected to one end of the lever 19 pivotably mounted on the carburetor 6. The carburetor 6 is provided with a diaphragm device 23 having an atmospheric pressure chamber 21 and a vacuum chamber 22 separated by a diaphragm 20. The other end of the above-mentioned lever 19 is connected to the diaphragm 20. When the vacuum level in the vacuum chamber 22 of the diaphragm device 23 is small, the power valve 17 closes the power port 16. On the other hand, when the vacuum level in the vacuum chamber 22 is increased, the diaphragm 20 moves downwards against the spring force of the compression springs 24 and 25. As a result of this, since the power valve 17 is opened, a fuel is fed into the main nozzle 14 from the power port 16, whereby a rich air-fuel mixture is formed in the carburetor 6.

An internal combustion engine according to the present invention further comprises a secondary air feed control valve 26 and an electromagnetic valve 61. The secondary air feed control valve 26 has in its housing a secondary air feed chamber 28 and a secondary air return chamber 29 which are interconnected with each other via a valve port 27. The suction side of the air pump 9 is connected to the air cleaner 8 via a secondary air conduit 30, while the delivery side of the air pump 9 is connected to the secondary air feed chamber 28 via a secondary air conduit 31. In addition, the secondary air return chamber 29 is connected to the air cleaner 8 via a secondary air return conduit 32. On the other hand, the secondary air feed chamber 28 is connected to the exhaust manifold 3 via a check valve 33 and an air manifold 34. This check valve 33 allows the outflow of secondary air from the secondary air feed chamber 28 to the exhaust manifold 3. Consequently, secondary air introduced into the secondary air feed chamber 28 from the air pump 9 is fed into the exhaust manifold 3 via the check valve 33 and the air manifold 34.

The secondary air feed control valve 26 has a diaphragm device 35 comprising a vacuum chamber 37 and an atmospheric pressure chamber 38 separated by a diaphragm 36. An air control valve 39 is disposed in the secondary air feed chamber 28 for controlling the opening area of the valve port 27 and is connected to the diaphragm 36 via a valve stem 40.

When the vacuum level in the vacuum chamber 37 of the diaphragm device 35 is small, the air control valve 39 is opened. Consequently, at this time, since a part of the secondary air introduced into the secondary air feed chamber 28 from the air pump 9 is returned into the air cleaner 8 via the valve port 27 and the secondary air return conduit 32 the remaining secondary air is fed into the exhaust manifold 3 via the check valve 33 and the air manifold 34. Contrary to this, when the vacuum level in the vacuum chamber 37 is increased, the diaphragm 36 moves upwards against the spring force of a compression spring 41. As a result of this, since the air control valve 39 completely closes the valve port 27, the entire quantity of secondary air introduced into the secondary air feed chamber 28 from the air pump 9 is fed into the exhaust manifold 3.

The electromagnetic valve 61 has in its housing a solenoid 42 and a pressure control chamber 43. This pressure control chamber 43 is connected to the atmosphere via a valve port 44. An opening control valve 45 is disposed in the pressure control chamber 43 for controlling the opening operation of the valve port 44, and is connected to a movable plunger 46 disposed in the solenoid 42. As the opening control valve 45 closes the valve port 44 due to the spring force of a compression spring 47, the plunger 46 moves upwards against the spring force of the compression spring 47 when the solenoid 42 is energized, whereby the opening control valve 45 is seated on a valve seat 56. As a result of this, the pressure control chamber 43 is connected to the atmosphere via the valve port 44.

The pressure control chamber 43 is connected to the vacuum chamber 37 of the diaphragm device 35 and to the vacuum chamber 22 of the diaphragm device 23 via a vacuum conduit 48. In addition, the pressure control chamber 43 is connected via a vacuum conduit 49 to a vacuum port 50 opening into an intake passage 60 in the carburetor 6. This vacuum port 50 is so arranged that the vacuum port 50 opens into the intake passage 60 at a position located downstream of a throttle valve 51 when the throttle valve 51 is opened through more than 9 degrees from its closed position.

The solenoid 42 of the electromagnetic valve 61 is connected to a power source 55 via a top switch 52, a temperature detecting switch 53 and an ignition switch 54. This top switch 52 is associated with the transmission (not shown) of the engine so that the top switch 52 is turned to the ON condition when the shift gear (not shown) of the transmission is in the top gear position, while the top switch 52 is turned to the OFF condition when the shift gear (not shown) of the transmission is in any of the other gear positions except for the top gear position.

The temperature detecting switch 53 is provided for detecting the temperature of the cooling water of the engine. This temperature detecting switch 53 is turned to the ON condition when the temperature of the cooling water is increased beyond, for example, 50° C; while the temperature detecting switch 53 is turned to the OFF condition when the temperature of the cooling water is decreased below 50° C. Consequently, when the shift gear of the transmission is in the top gear position and when the temperature of the cooling water is more than 50° C, the solenoid 42 is energized.

Assuming that a vehicle is driven before the completion of the warm-up of the engine, the temperature detecting switch 53 is in the OFF condition. Consequently, at this time, even if the shift gear of the transmission is in the top gear position, the solenoid 42 is not energized. Therefore, since the opening control valve 45 continues to close the valve port 44, a vacuum which is at the same level as that in the vacuum port 50 is always produced in the vacuum chamber 37 of the diaphragm device 35 and in the vacuum chamber 22 of the diaphragm device 23. Consequently, at the time of idling and when the opening degree of the throttle valve 51 is less than 9 degrees, the vacuum port 50 has an approximately atmospheric pressure. As a result of this the power valve 17 of the carburetor 6 is closed, and the air control valve 39 thereby opens the valve port 27. Therefore, a relatively lean air-fuel mixture is fed into the intake manifold 2, and a part of the secondary air introduced into the secondary air feed chamber 28 from the air pump 9 is fed into the exhaust manifold 3.

When the opening degree of the throttle valve 51 is larger than 9 degrees, a vacuum is produced in the vacuum chamber 37 of the diaphragm device 35 and in the vacuum chamber 22 of the diaphragm device 23. As a result of this, the power valve 17 of the carburetor 6 is opened, and thus the air control valve 39 closes the valve port 27. Consequently, a relatively rich air-fuel mixture is fed into the intake manifold 2, and the entire quantity of the secondary air introduced into the secondary air feed chamber 28 from the air pump 9 is fed into the exhaust manifold 3.

When the throttle valve 51 is fully opened, the vacuum port 50 attains an approximately atmospheric pressure. Consequently, in the same manner as that at the time of idling, a relatively lean air-fuel mixture is fed into the intake manifold 2, and a part of the secondary air introduced into the secondary air feed chamber 28 from the air pump 9 is fed into the exhaust manifold 3.

If a vehicle is driven after the completion of the warm-up of the engine, the temperature detecting switch 53 will be in the ON condition. Consequently, when the shift gear of the transmission is shifted to the top gear position, the solenoid 42 becomes energized.

At the time of idling and when the opening degree of the throttle valve 51 is less than 9 degrees, the vacuum port 50 has an approximately atmospheric pressure. Consequently, the pressure in the pressure control chamber 43 of the electromagnetic valve 61 is maintained at an approximately atmospheric pressure irrespective of whether the opening control valve 45 is opened or closed, that is, in spite of whether the shift gear of the transmission is in the top gear position or in the other gear positions. Therefore, the power valve 17 of the carburetor 6 is closed, and thereby the air control valve 39 opens the valve port 27. As a result of this, a relatively lean air-fuel mixture is fed into the intake manifold 2, and a part of the secondary air introduced into the secondary air feed chamber 28 from the air pump 9 is fed into the exhaust manifold 3.

When the opening degree of the throttle valve 51 is greater than 9 degrees and when the shift gear of the transmission is in the low gear position or in the second gear position, that is, at the time of acceleration, since the opening control valve 45 of the electromagnetic valve 27 is closed, a vacuum is produced in the vacuum chamber 22 of the diaphragm device 23 and in the vacuum chamber 37 of the diaphragm device 35. Consequently, the power valve 17 of the carburetor 6 is opened, and the air control valve 39 closes the valve port 27. As a result of this, a relatively rich air-fuel mixture is fed into the intake manifold 2, and the entire quantity of the secondary air introduced into the secondary air feed chamber 28 from the air pump 9 is fed into the exhaust manifold 3.

When the opening degree of the throttle valve 51 is greater than 9 degrees and when the shift gear of the transmission is in the top gear position, that is, when a vehicle is running at a constant speed, the top switch 52 is turned to the ON condition. Consequently, since the opening control valve 45 of the electromagnetic valve 61 opens the valve port 44, the pressure in the pressure control chamber 43 is changed to atmospheric pressure. As a result of this, the power valve 17 of the carburetor 6 is closed, and the air control valve 39 opens the valve port 27. Consequently, a relatively lean air-fuel mixture is fed into the intake manifold 2, and a part of the secondary air introduced into the secondary air feed chamber 28 from the air pump 9 is fed into the exhaust manifold 3.

When the throttle valve 51 is fully opened, the vacuum port 50 has an approximately atmospheric pressure. Therefore, the pressure in the pressure control chamber 43 of the electromagnetic valve 61 is changed to an approximately atmospheric pressure irrespective of whether the opening control valve 45 is opened or closed. At this time, the power valve 17 of the carburetor 6 is closed, and the air control valve 39 thus opens the valve port 27. As a result of this, relatively lean air-fuel mixture is fed into the intake manifold 2, while a part of the secondary air introduced into the secondary air feed chamber 28 from the air pump 9 is fed into the exhaust manifold 3.

Figure 2:
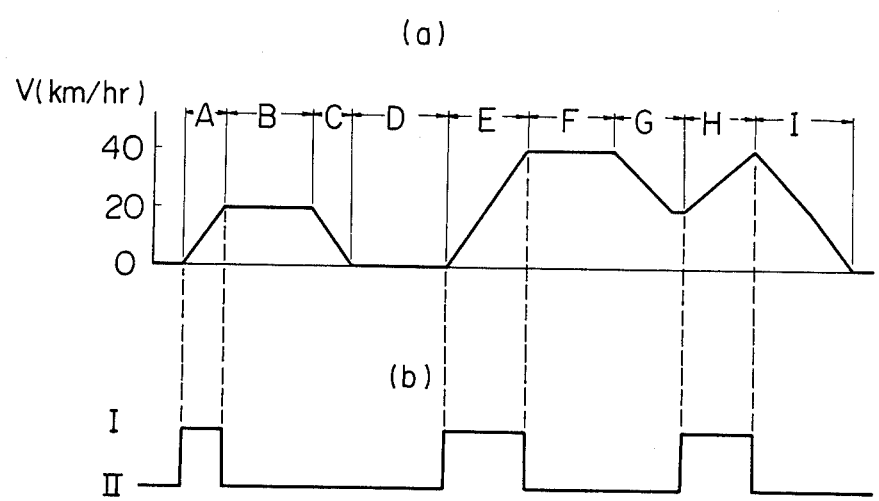
FIG. 2 (a) is a graph showing the relationship between the speed of a vehicle and the time, and FIG. 2 (b) is a graph showing a change in the feeding amount of secondary air when the vehicle is driven as shown in FIG. 2 (a).

FIG. 2 (a) shows a relationship between the time and the speed of a vehicle equipped with an engine according to the present invention, and FIG. 2 (b) shows the change in the operating conditions of the secondary air control valve when the vehicle is running as shown in FIG. 2 (a). In FIG. 2 (b), I shows the case wherein the opening control valve 39 of the secondary air feed control valve 26 is closed, whereby a large amount of secondary air is fed into the exhaust manifold 3. Contrary to this, II shows the case wherein the air control valve 39 is opened, whereby a small amount of secondary air is fed into the exhaust manifold 3. In FIG. 2 (a), the ordinate indicates the velocity (Km/hr) of a vehicle, and the abscissa indicates the time.

In FIG. 2 (a), section A indicates the accelerating state of a vehicle in which the shift gear of the transmission is in the low gear position, and section E indicates the accelerating state of a vehicle in which the shift gear of the transmission is at first in the low gear position and then is sucessively shifted to the second gear position. In addition, section H indicates the accelerating state of a vehicle in which the shift gear of the transmission is in the second gear position. In such accelerating states, as mentioned hereinbefore, a relatively rich air-fuel mixture is fed into the intake manifold 2, and a large amount of secondary air is fed into the exhaust manifold 3 as shown in FIG. 2 (b). On the other hand, section B indicates the running state at a constant speed in which the shift gear of the transmission is in the second gear position, and section F indicates the running state at a constant speed in which the shift gear of the transmission is in the top gear position. In addition, sections C, G and I indicate the decelerating states of a vehicle, and section D indicates the idling state of an engine. In these sections, B, C, D, F, G and I, as mentioned hereinbefore, a relatively lean air-fuel mixture is fed into the intake manifold 2, and a small amount of secondary air is fed into the exhaust manifold 3.

According to the present invention, by controlling an amount of the secondary air fed into the exhaust system of the engine, the temperature of the catalyzer will rise up to about 550° C from 450° C, whereby the purifying coefficency of unburned components HC and CO can be increased up to 90 percent from 80 percent. In addition, while an amount of secondary air to be fed into the exhaust manifold 3 is required to be regulated in order to obtain the maximum purifying coefficiency, such regulation can be easily effected by regulating the opening area of the valve port 27 and the spring force of the compression spring 41 or by forming a restricted opening in the secondary air return conduit 32. Furthermore, the present invention can be applied to a gasoline engine having an air-fuel mixture feeding apparatus in which a rich air-fuel mixture is fed into the intake system of the engine when the shift gear of the transmission is in the low gear position or in the second gear position; while a lean air-fuel mixture is fed into the intake system when the shift gear of the transmission is in the top gear position.

While the invention has been described by referring to a specific embodiment chosen for purposes of illustration, it should be apparent that numerous modifications could be made thereto by those skilled in the art without departing from the spirit and scope of the invention.

What is claimed is:

1. A secondary air feed control device of an internal combustion engine for purifying the exhaust gas, said engine having a transmission, an intake passage and an exhaust passage equipped with a catalytic converter, said transmission having a shift gear, said control device comprising:

air-fuel mixture forming means for increasing an air-fuel ratio of an air-fuel mixture fed into said intake passage after completion of the warm-up of the engine compared with a case wherein the warm-up of the engine is not completed;

first detecting means for providing a first detecting signal which indicates the completion of the warm-up of the engine;

second detecting means for providing a second detecting signal which indicates that the shift gear of said transmission is in the top gear position;

additional fuel feed control means controlling a feeding amount of an additional fuel into said intake passage in response to a change in the vacuum in said intake passage and having
  (a) a first operating state in which the feeding operation of an additional fuel remains stopped, and
  (b) a second operating state in which an additional fuel is fed into said intake passage when a vacuum level in said intake passage is greater than a predetermined level, while stopping the feeding operation of an additional fuel when a vacuum level in said intake passage is smaller than a predetermined value, valve means controlling a feeding amount of secondary air into said exhaust passage located upstream of said catalytic converter in response to a change in the vacuum in said intake passage and having
  (c) a first opening state in which a relatively small amount of secondary air continues to be fed into said exhaust passage, and
  (d) a second opening state in which a relatively large amount of secondary air is fed into said exhaust passage when a vacuum level in said intake passage is greater than a predetermined level, while feeding a relatively small amount of secondary air into said exhaust passage when a vacuum level in said intake passage is smaller than a predetermined level, and shifting means responsive to said first and said second detecting signals for causing said additional fuel feed control means and said valve means to shift to said first operating state and said first opening state from said second operating state and said second opening state, respectively, when the shift gear of said transmission is in the top gear position after completion of the warm-up of the engine, and for causing said additional fuel feed control means and said valve means to shift to said second operating state and said second opening state from said first operating state and said first opening state, respectively, when the warm-up of the engine is not completed or when the shift gear of said transmission is not in the top gear position.

2. A secondary air feed control device as claimed in claim 1, in which a throttle valve is disposed in said intake passage, wherein said additional fuel feed control means and said valve are connected via a vacuum conduit to a vacuum port opening into said intake passage at a position located upstream of said throttle valve when the opening degree of said throttle valve is smaller than a predetermined degree, and opening into said intake passage at a position located downstream of said throttle valve when the opening degree of said throttle valve is larger than a predetermined degree, said shifting means being disposed in said vacuum conduit for communicating said vacuum conduit with the atmosphere when the shift gear of the transmission is in the top gear position after completion of the warm-up of the engine.

3. A secondary air feed control device as claimed in claim 2, wherein said valve means comprises a diaphragm apparatus having a diaphragm and a vacuum chamber therein, and an opening control valve connected to said diaphragm, said vacuum chamber being connected to said vacuum port via said shifting means, and wherein a relatively large amount of secondary air is fed into said exhaust passage when a vacuum level in said vacuum chamber is greater than a predetermined level, while feeding a relatively small amount of secondary air into said exhaust passage when a vacuum level in said vacuum chamber is smaller than a predetermined level.

4. A secondary air feed control device as claimed in claim 3, in which said engine comprises an air pump driven by said engine, wherein said valve means is disposed in a secondary air conduit connecting said air pump with said exhaust passage, the entire quantity of the secondary air introduced into said valve means from said air pump being fed into said exhaust passage when a vacuum level in said vacuum chamber is greater than a predetermined level, while feeding a part of the secondary air introduced into said valve means from said air pump into said exhaust passage when a vacuum level in said vacuum chamber is smaller than a predetermined level.

5. A secondary air feed control device as claimed in claim 2, wherein said additional fuel feed control means comprises a diaphragm apparatus having a diaphragm and a vacuum chamber therein, and an opening control valve connected to said diaphragm, said vacuum chamber being connected to said vacuum port via said shifting means, an additional fuel being fed into said intake passage when a vacuum level in said vacuum chamber is greater than a predetermined level, while stopping the feeding operation of an additional fuel when a vacuum level in said vacuum chamber is smaller than a predetermined level.

6. A secondary air feed control device as claimed in claim 2, wherein said shift means comprises an electromagnetic valve having a solenoid and an opening control valve operated by said solenoid, said solenoid being energized when the shift gear of the transmission is in the top gear position after completion of the warm-up of the engine.

7. A secondary air feed control device as claimed in claim 2, wherein said predetermined degree of the throttle valve is 9 degrees.

8. A secondary air feed control device as claimed in claim 1, wherein said first detecting means comprises a temperature detecting means for detecting the temperature of a cooling water of the engine.

9. A secondary air feed control device as claimed in claim 1, wherein said second detecting means comprises a top switch which is connected to the shift gear of said transmission of the engine.

* * * * *